(12) United States Patent
Collet et al.

(10) Patent No.: US 7,886,056 B2
(45) Date of Patent: Feb. 8, 2011

(54) METHOD AND APPARATUS FOR WORKLOAD MANAGEMENT OF A CONTENT ON DEMAND SERVICE

(75) Inventors: Jean-Luc Collet, La Gaude (FR); Francois-Xavier Drouet, La Gaude (FR); Stephane Charles Michel Marie Lebrun, Biot (FR); Gerard Marmigere, Drap (FR)

(73) Assignee: International Business Machines Corporation, Armonk, NY (US)

( * ) Notice: Subject to any disclaimer, the term of this patent is extended or adjusted under 35 U.S.C. 154(b) by 948 days.

(21) Appl. No.: 11/442,446

(22) Filed: May 25, 2006

(65) Prior Publication Data

US 2007/0005771 A1 Jan. 4, 2007

(30) Foreign Application Priority Data

Jun. 29, 2005 (EP) .................................. 05300528

(51) Int. Cl.
*G06F 15/173* (2006.01)
(52) U.S. Cl. ........................... 709/226; 725/93; 725/94; 725/95; 725/96; 725/97
(58) Field of Classification Search .................. 709/226
See application file for complete search history.

(56) References Cited

U.S. PATENT DOCUMENTS 5,357,276 A * 10/1994 Banker et al. ............... 725/102

| 5,941,951 A | 8/1999 | Day et al. |
| 6,211,901 B1 * | 4/2001 | Imajima et al. ............... 725/93 |
| 6,272,127 B1 | 8/2001 | Golden et al. |

(Continued)

FOREIGN PATENT DOCUMENTS

EP 1617591 A1 * 1/2006

(Continued)

OTHER PUBLICATIONS

Russell J. Clark, "Providing Scalable Web Service Using Multicast Communication," In Proceedings of the IEEE Workshop on Services in Distributed and Networked Environments, 1995.*

(Continued)

*Primary Examiner*—Joseph Thomas
*Assistant Examiner*—Andrew Georgandellis
(74) *Attorney, Agent, or Firm*—Schmeiser, Olsen & Watts; John Pivnichny (57) ABSTRACT

A method and computer system for managing bandwidth in a content on demand service provided by a service provider to users. A request is received from a user to receive the content. If it is ascertained that a total number of users requesting the content within a predetermined time period is below a first specified threshold, then the user is connected to a unicast stream of the content. If it is ascertained that a total number of users requesting the content within a predetermined time period is not below a first specified threshold, then the user is connected to a first multicast stream of the content. A video carousel includes at least two multicast streams that contains the first multicast stream. Each multicast stream has been or will be initiated at a unique time slot of a time period that is equal to the time duration of the content.

20 Claims, 6 Drawing Sheets

U.S. PATENT DOCUMENTS

| | | | |
|---|---|---|---|
| 6,308,328 B1 | 10/2001 | Bowcutt et al. | |
| 6,332,163 B1 | 12/2001 | Bowman-Amuah | |
| 6,452,924 B1 | 9/2002 | Golden et al. | |
| 6,543,053 B1 | 4/2003 | Li et al. | |
| 6,754,181 B1 | 6/2004 | Elliott et al. | |
| 6,987,728 B2 | 1/2006 | Deshpande | |
| 6,996,129 B2 | 2/2006 | Krause et al. | |
| 7,096,037 B2 | 8/2006 | Canova et al. | |
| 7,174,384 B2* | 2/2007 | Cheung et al. | 709/231 |
| 7,305,431 B2* | 12/2007 | Karnik et al. | 709/203 |
| 2002/0078219 A1 | 6/2002 | Tate et al. | |
| 2003/0037331 A1 | 2/2003 | Lee | |
| 2003/0051251 A1 | 3/2003 | Sugimoto et al. | |
| 2003/0093802 A1 | 5/2003 | Cho et al. | |
| 2004/0125128 A1* | 7/2004 | Chang et al. | 345/730 |
| 2004/0132448 A1 | 7/2004 | Torres et al. | |
| 2004/0261094 A1 | 12/2004 | Huslak et al. | |
| 2005/0071882 A1 | 3/2005 | Rodriguez et al. | |
| 2005/0190794 A1 | 9/2005 | Krause et al. | |
| 2006/0047845 A1* | 3/2006 | Whited et al. | 709/231 |
| 2007/0005771 A1 | 1/2007 | Collet et al. | |

FOREIGN PATENT DOCUMENTS

| | | |
|---|---|---|
| GB | 2 385 683 A | 8/2003 |
| JP | 2003250138 A | 9/2003 |
| WO | WO 99/63759 | 12/1999 |
| WO | WO 02/49360 A1 | 6/2002 |

OTHER PUBLICATIONS

Notice of Allowance (Mail Date May 15, 2009) for U.S. Appl. No. 11/442,071, filed May 25, 2006; Confirmation No. 9846.

* cited by examiner

| Hex Value | Message | Description |
|---|---|---|
| 0x11 | Membership Query | These are used by the router to see whether any group members exist. Two types of membership query can be differentiated by the group address in the 32-bit group address field. A general query has a group address in the IGMP header of all zeros, and asks which groups have members on an attached network. A group-specifc query returns information on whether a particular group has members. |
| 0x16 | Version 2 Membership Report | When a host joins a multicast group, a membership report is sent to the router to inform the router that a system on the network is listening to multicast messages. |
| 0x17 | Leave Group | The last host of a multicast group inside a subnet must send a leave group message to all routers (224.0.0.2) when it leaves a group. A host may remember the hosts of the multicast group (received in membership reports in response to membership queries) so that it knows when it is the last one in the group, but this is not a requirement. If the group members are not remembered, every host leaving a group sends a leave group message. In any case a router checks if it was the last host in the group, and stops forwarding multicast messages if so. |
| 0x12 | Version 1 Membership Report | This report is used for compatibility reasons with IGMP v1. |

METHOD AND APPARATUS FOR WORKLOAD MANAGEMENT OF A CONTENT ON DEMAND SERVICE

CROSS REFERENCE TO RELATED APPLICATIONS

This application is related to U.S. patent application Ser. No. 11/442,071 entitled "METHOD AND APPARATUS FOR MANAGING BANDWIDTH REQUIREMENTS FOR VIDEO ON DEMAND SERVICEs", filed on May 25, 2006, and hereby incorporated by reference.

BACKGROUND OF THE INVENTION

1. Technical Field

The present invention relates to the field of Video on Demand (VOD), and more particularly to a method and system for workload management in VOD services.

2. Related Art

A VOD service relies on a network Internet Protocol (IP) infrastructure and is generally based on three main components: head end equipment, middleware equipment, and end-user equipment.

The first component of head end equipment is the platform responsible for presenting the live content available to the user and may include managing the dynamic information coming from a broadcaster for an Electronic Programming Guide (EPG). The head end may also provide the administration services for the encoders/transcoders used to transmit the video streams to the users.

The second component of middleware equipment ensures the digital content delivery and provides the portal and services such as VOD that could be installed closed to the Digital Subscriber Line Access Multiplexer (DSLAM). The DSLAM is responsible for connecting the PSTN line to the IP Backbone of the operator. The user could use the middleware to provide certain video services.

The third component of end-user equipment includes the elements installed at the point at which the content is viewed by a user. This may include such elements as residential gateway (Modem), a Set Top Box (STB), an IP or Analogue phone and a PC. Video services may be provided in the STB or the PC or in some other way.

The combination of the three components is called the "triple play" model and could be relevant in different environments such as mobile phones, PDAs and car embedded devices.

A broadcast system such as that described above is based on a multicast mechanism (one to many connections) and uses the IP Group Multicast Protocol RFC1112 to manage the user requests. Users requesting the streaming of the same Video are brought together to become members of a unique IP Multicast Group (IPMG).

On the other hand a Video on Demand service is based on a unicast mechanism (one to one connection) and uses the Real Time Streaming Protocol (RTSP) (see RFC 2326). When a user wants to view a video, a unicast peer to peer session is created between user equipment and a Video server. The means used to manage the interaction with the video such as "Pause", "Fast backward", "Fast forward" and "Play" is handled by the RTSP. A Unicast peer to peer session leads to a huge number of sessions which may be very expensive in terms of bandwidth and server charges but give greater user flexibility in terms of viewing capabilities and functions.

With respect to multicast broadcasts there are also some advantages and disadvantages. In a multicast session the users must all start the video streaming at the same time and the VCR functions described above (i.e. "Pause", "Fast backward", "Fast forward" and "Play) are no longer available.

Real Time Streaming Protocol (RTSP) is an Internet Engineering Task Force (IETF) proposed standard for controlling streaming media (see RFC 2326). It describes a set of messages that enable the efficient delivery of streamed multimedia over Internet Protocol (IP) networks.

RTSP works with established protocols, such as the Real Time Transport Protocol (RTP—see RFC 1889) and Hypertext Transfer Protocol (HTTP), to provide an integrated approach to streaming media over the Internet.

In VOD service, a user makes a request to a server to receive a media stream using VCR-style asset controls such as play, fast-forward, rewind and pause. To implement these actions, the server uses RTSP message pairs which consist of a user request and a server response. One user action can give rise to more than one Time streaming Protocol (TSP) message pair.

Figure 1:
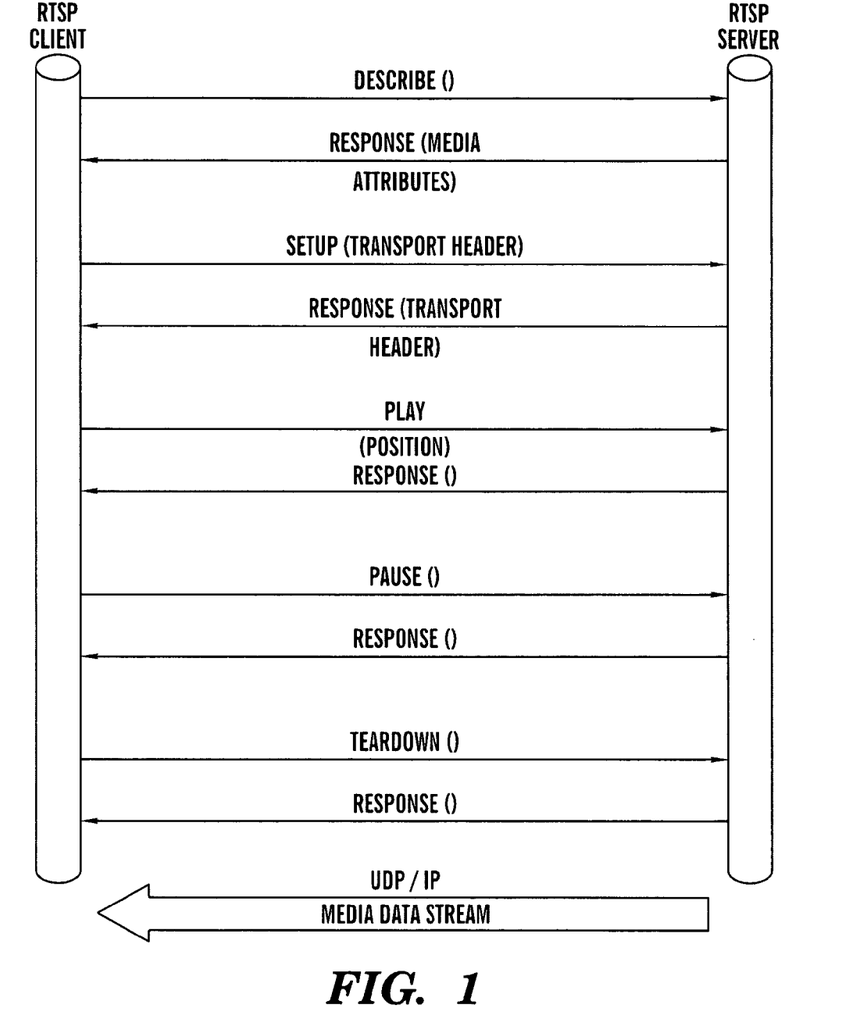
FIG. 1 is a diagram showing the main messages used in the Real Time Streaming Protocol (RTSP).

FIG. 1 shows the main types of message that may be used in the RTSP protocol.

A user requests a movie with the DESCRIBE and SETUP requests. The server responds with a DESCRIBE response and provides parameters related to the media, such as the audio header and duration. The SETUP message transmits transport parameters and establishes a session with a unique session ID. Once the movie is opened, the user can play it in normal, fast-forward, or rewind mode by sending a PLAY request with a Scale parameter that indicates the mode and speed. A PAUSE request may also be sent to pause the movie. Finally, a TEARDOWN request allows the user to exit from viewing the movie.

As previously indicated IP multicast provides an efficient one-to-many delivery service. To achieve such a delivery using IP unicast traffic, each datagram needs to be sent many times. To achieve one-to-many delivery using IP broadcast traffic, a single datagram is sent, but all nodes process it, even those that are not interested in it. Broadcast delivery service is unsuitable for inter-networks, as routers are designed to prevent the spread of broadcast traffic. With IP multicast, a single datagram is sent and forwarded across routers only to the network segments containing nodes that are interested in receiving it.

Historically, IP multicast traffic has been little utilized. However, recent developments in audio and video teleconferencing, distance learning, and data transfer to a large number of hosts have made IP multicast traffic more important.

The following describes the main details of IP multicast operations.

All multicast traffic is sent to a class D address in the range 224.0.0.0 through 239.255.255.255 (224.0.0.0/4). All traffic in the range 224.0.0.0 through 224.0.0.255 (224.0.0.0/24) is for the local subnet and is not forwarded by routers. Multicast-enabled routers forward multicast traffic in the range 224.0.1.0 through 239.255.255.255 with an appropriate Time to Live (TTL). A specific multicast address is called a group address.

The set of hosts that wish to receive multicast traffic at a specific group address is called a multicast group or host group. Multicast group members can receive traffic at their unicast address and the group address. Multicast groups can be permanent or transient. A permanent group is assigned a well-known group address. An example of a permanent group is the all-hosts multicast group, awaiting traffic on the well-known multicast address of 224.0.0.1. The membership of a permanent group is transient, only the group address is permanent.

There are no limits on the size of a multicast group. A host can send multicast traffic to the group address without belonging to the multicast group. There are no limits to how many multicast groups a host can belong to. There are no limits on when members of a multicast group can join and leave a multicast group. There are no limits on the location of multicast group members. IP multicast must be supported by the hosts and the routers of an IP inter-network.

Figure 2A:
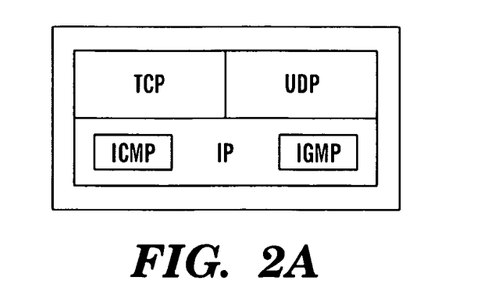
FIG. 2A is an example of an IP Multicast Group (IPMG) message encapsulated in a datagram.

IGMP is used by IP hosts to report group memberships to any neighboring routers that are multicast enabled. IGMP is implemented in the IP module as shown if FIG. 2A. IGMP messages are generally encapsulated in IP datagrams.

Figure 2B:
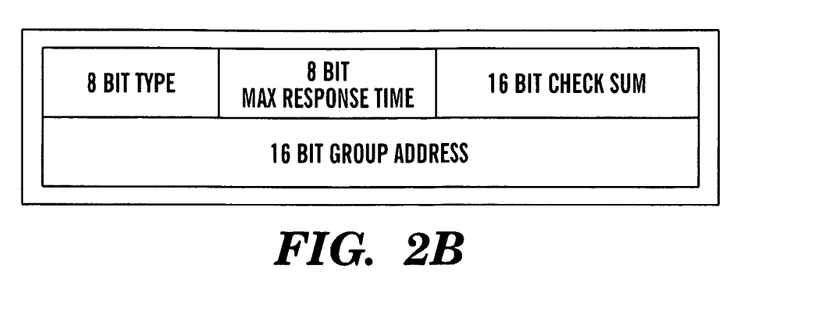
FIG. 2B is a second IPMG message.

An IGMP v2 message consists of 64 bits, and contains the type of the message, a maximum response time (used only for membership queries), a checksum, and the group address as is shown in FIG. 2B.

Figure 2C:
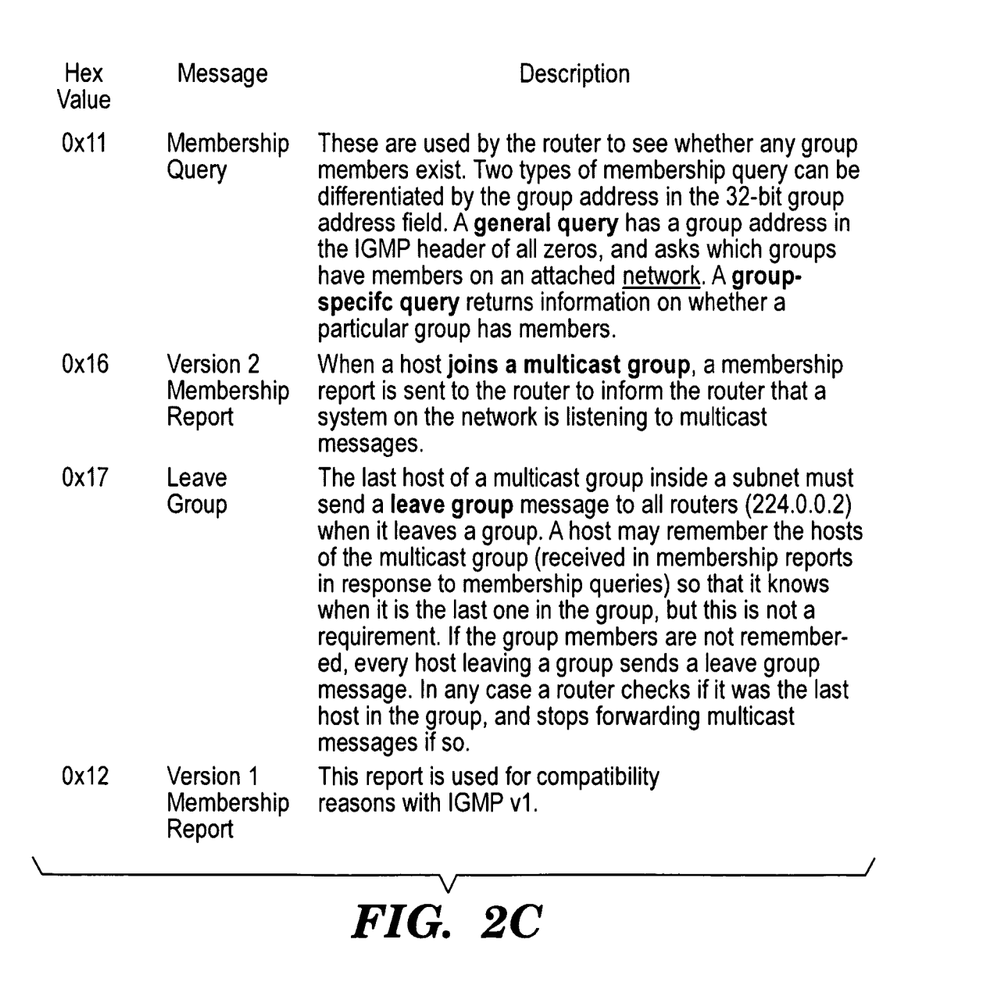
FIG. 2C is a table showing message types between a host and a router.

The message types used for communication between a host and a router are defined by the first 8 bits of IGMP v2 message headers, and are shown in FIG. 2C.

One of the main problems which exist in the area of VOD is the amount of variation in the demand for service. This is particularly the case where a system allocates each user a unicast timeslot when they demand it. For example, take a typical weekday for a VOD service: in the morning and afternoon there may be a sporadic and relatively low number of demands. However, in the evening there may be many users wanting to watch a video. Also the demand may escalate dramatically at the week-end, if the weather is poor, if a new film is released or just because it does.

There have been a number of workload management solutions proposed which are intended to minimise the impact on bandwidth of unicast VOD services.

One main solution is to use a content delivery network (CDN) architecture. This uses load balancing on a cluster of servers and replication of the video on many servers (proxy cache) distributed in different locations which are closer to the user. This solution is costly and requires a sophisticated architecture including many additional servers, switches and engines.

Patching has also been used as a way to allow a user to join an existing multicast for some or all of the video. This involves downloading a portion to user Set Top Box (STB) from a dedicated patching multicast stream. In the meantime a regular multicast is downloaded to the buffer in the STB and stored until the patching stream has reached the starting point of the regular stream stored in the buffer. Then the buffer is emptied to allow the user to view the video from the regular stream and also reloaded with the following parts of that stream for the remainder of the video. Relying on extensive use of the buffer in the STB is not an ideal solution as manufacturers are more and more producing STBs without so much buffer.

Many algorithms have been proposed for providing stream merging, with the purpose of merging streams started at different times, in order to reduce bandwidth. These are very complicated and do not always give the user a good quality viewing as speeds of streams have to change or be delayed to permit the required merging. Also the bandwidth saving are generally quite minor.

Another solution is known as piggybacking. This is a hardware solution which again requires streams to be speeded up and slowed down in order to splice two streams which started at similar times. Again, in practice this is very difficult to achieve and the user can generally see the changes and thus the quality of service is effectively diminished.

Thus, there is a need for a solution to the problem of workload management which overcomes at least some of the disadvantages of known solutions.

SUMMARY OF THE INVENTION

The present invention provides a method for managing bandwidth in a content on demand service provided by a service provider to users, said method comprising:

receiving a request from a user to receive the content;

after said receiving, ascertaining whether a total number of users requesting the content within a predetermined time period is below a first specified threshold;

if said ascertaining ascertains that the total number of users requesting the content within the predetermined time period is below the first specified threshold, then connecting the user to a unicast stream of the content; and if said ascertaining ascertains that the total number of users requesting the content within the predetermined time period is not below the first specified threshold, then connecting the user to a first multicast stream of the content, wherein a video carousel comprises a plurality of multicast streams that includes the first multicast stream, and wherein each multicast stream of the plurality of multicast streams has been or will be initiated at a unique time slot of a time period that is equal to the time duration of the content.

The present invention provides a computer system comprising a server and a computer program, said computer program comprising instructions for implementing a method for managing bandwidth in a content on demand service provided by a service provider to users, said method being implemented via execution of the instructions on the server, said method comprising:

receiving a request from a user to receive the content;

after said receiving, ascertaining whether a total number of users requesting the content within a predetermined time period is below a first specified threshold;

if said ascertaining ascertains that the total number of users requesting the content within the predetermined time period is below the first specified threshold, then connecting the user to a unicast stream of the content; and if said ascertaining ascertains that the total number of users requesting the content within the predetermined time period is not below the first specified threshold, then connecting the user to a first multicast stream of the content, wherein a video carousel comprises a plurality of multicast streams that includes the first multicast stream, and wherein each multicast stream of the plurality of multicast streams has been or will be initiated at a unique time slot of a time period that is equal to the time duration of the content.

The present invention provides a solution to the problem of workload management which overcomes at least one of the disadvantages of known solutions.

DETAILED DESCRIPTION OF THE INVENTION

Figure 3:
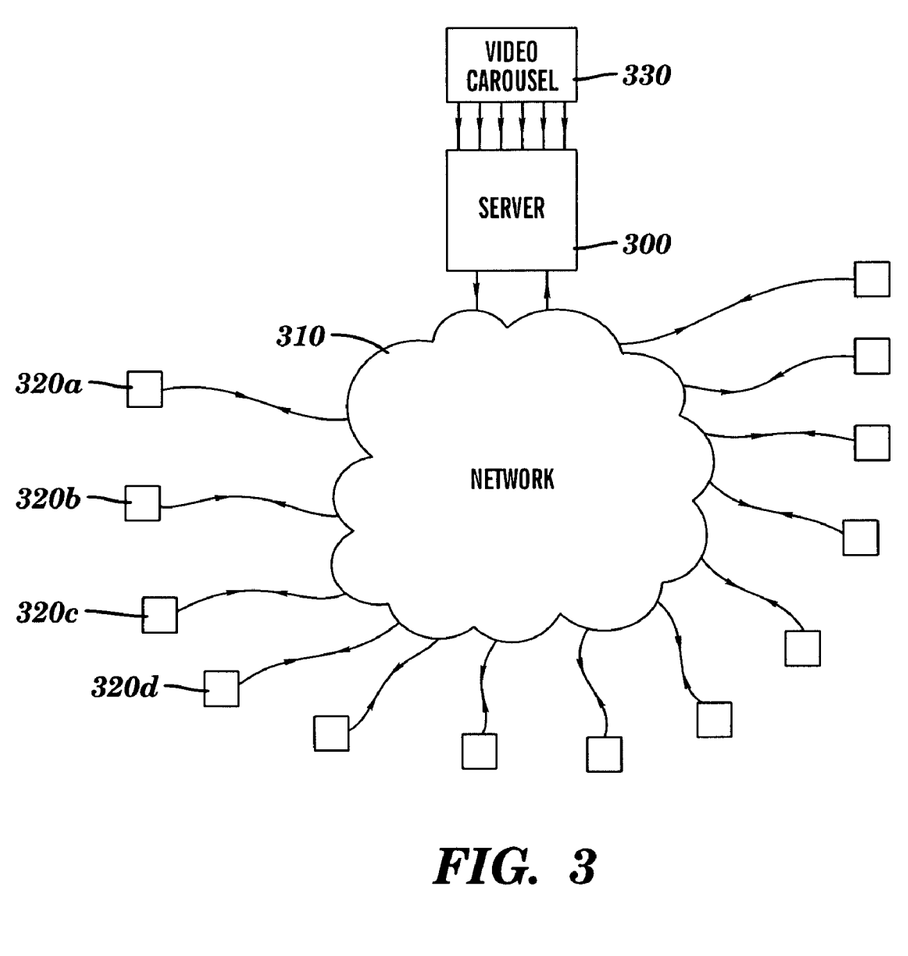
FIG. 3 is a diagram showing a Video on Demand (VOD) system that comprises a video carousel, in accordance with embodiments of the present invention.

FIG. 3 is a diagram showing a Video on Demand (VOD) system, in accordance with embodiments of the present invention. The system includes a server 300 connected to a network 310. There are also a plurality of remote users 320a, 320b, 320c etc. connected to the network 310. A remote user, for example 320c, requests a video from the server 300. The server processes the request and connects the user to the required service and transmits the same as a unicast transmission.

As previously indicated it is never known exactly how many users are going to want to connect to a specific service at a specific time. The present invention is particularly concerned with times where they may be a very high demand for the services. Assuming a new and popular film is to be shown on the VOD server 300, many users (possibly thousands or tens of thousands) may be making requests to view the same. Generally each request will commence a unicast transmission of the film between the server and the user. In the suggested situation this could result in tens of thousands of unicast transmissions. Assuming the film is 90 minutes long and that a typical bit rate of a film on a unicast transmission is 3.5 Mb/s the bandwidth required by service provider to supply the tens of thousands of users will quickly become prohibitive.

Thus the present invention provides a video carousel 330 which generates the video streams for transmission during times where there is a high demand. It is possible that the video carousel 330 may also be used for other times as well.

Figure 4:
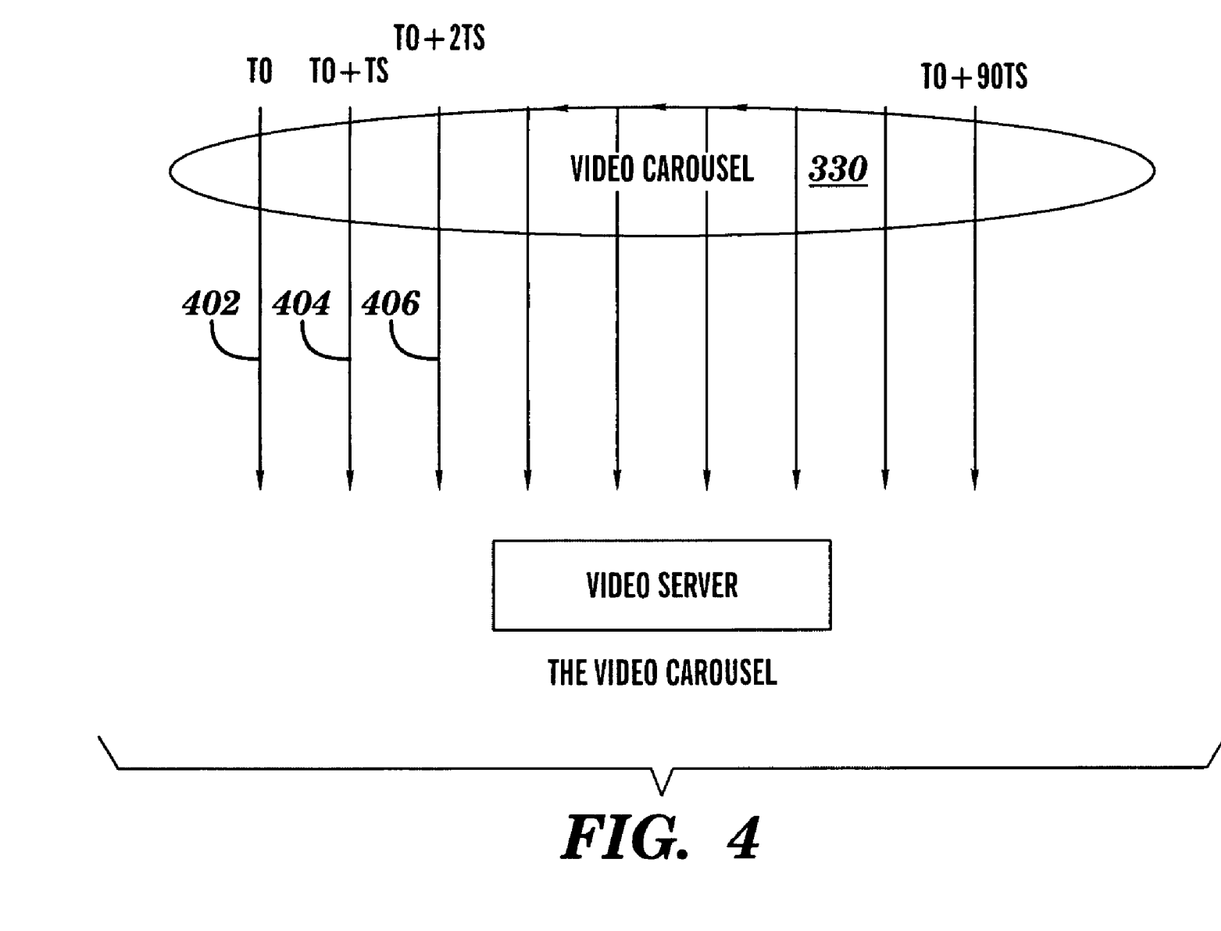
FIG. 4 is a diagram showing a video management process that utilizes the video carousel of FIG. 3, in accordance with embodiments of the present invention.

FIG. 4 is a diagram showing a video management process that utilizes the video carousel 330 of FIG. 3, in accordance with embodiments of the present invention. If the number of users requesting a particular video reaches a specific threshold, the video carousel 330 is switched into the system. The threshold may be for example, 90 users request the same service in a given time limit. The video carousel includes a plurality of multicast streams (402, 404, 406, etc.) such that the multicast streams commence at time slots that are uniformly spaced in time within the time duration of the content (e.g., successive multicast streams may commence at time separations of one minute). For example each multicast may commence at minute intervals; so for a 90 minute film there will be 90 multicast streams. It will be clear that the intervals and length of film are not prescribed and thus may vary from time to time. In order to handle very large demands on the system it may be necessary to prevent the use of functions associated with a unicast connection (e.g., VCR type functions). An alternative may be to utilize a scheme as is described in the related application (FR920050008US1, Ser. No. 11/442,071) in conjunction with the video carousel. The video carousel is shown as a loop as when the video has finished at one timeslot; that timeslot may then be used to provide a new start for the video.

The time shift is the time between two successive streams of the video carousel. The time shift may depend on the service agreements of the customer (e.g., of the order of 1 minute thereby giving an average delay of the order of 30 seconds for each user making a request for video content).

The threshold is defined by any appropriate means suitable for that particular circumstance. One means by which the threshold can be calculated is by a determination of the maximum available bandwidth for the whole service. Any allocated resources (e.g., unicast broadcasts that have already started or VCR functions) can be subtracted from the maximum available bandwidth, leaving the available bandwidth left to be used. From this value of available bandwidth, a threshold of users can be readily determined.

Thus, a remaining bandwidth can be determined as the difference between the maximum available bandwidth for and the existing total stream bandwidth being utilized by the multicast streams. Additional services may be provided to the user via the remaining bandwidth. The additional services may comprise at least one of: a video pause functionality, a fast-forward functionality, and a fast-backward functionality.

Once the threshold has been reached the carousel is switched into the system and each subsequent user will await the start of the next multicast transmission from the carousel. In one embodiment, a threshold number of users equals the length of the film in minutes; i.e., 90 minutes in the example of the above mentioned video. In other words the carousel will start when the $91^{st}$ user makes a request for content.

If possible, the other 90 users may be incorporated into the carousel, assuming the time that they are allocated to start the film has not passed. This will entail shifting any allocated, but not started, unicast transmissions to an equivalent multicast slot on the carousel.

The user may be connected to one slot of the carousel or more than one slot of the carousel. If the latter, the user may be able to view one slot on a main screen and others on a small screen. For example, the user may be able to see the previous and next five minute slots in a plurality of small screens. This can be used by the user to enable fast-forward and fast-backward functions in the carousel. As all the streams are already accommodated there will be no additional bandwidth resources needed for providing these functions. The user will merely need to change from one timeslot to another.

Figure 5:
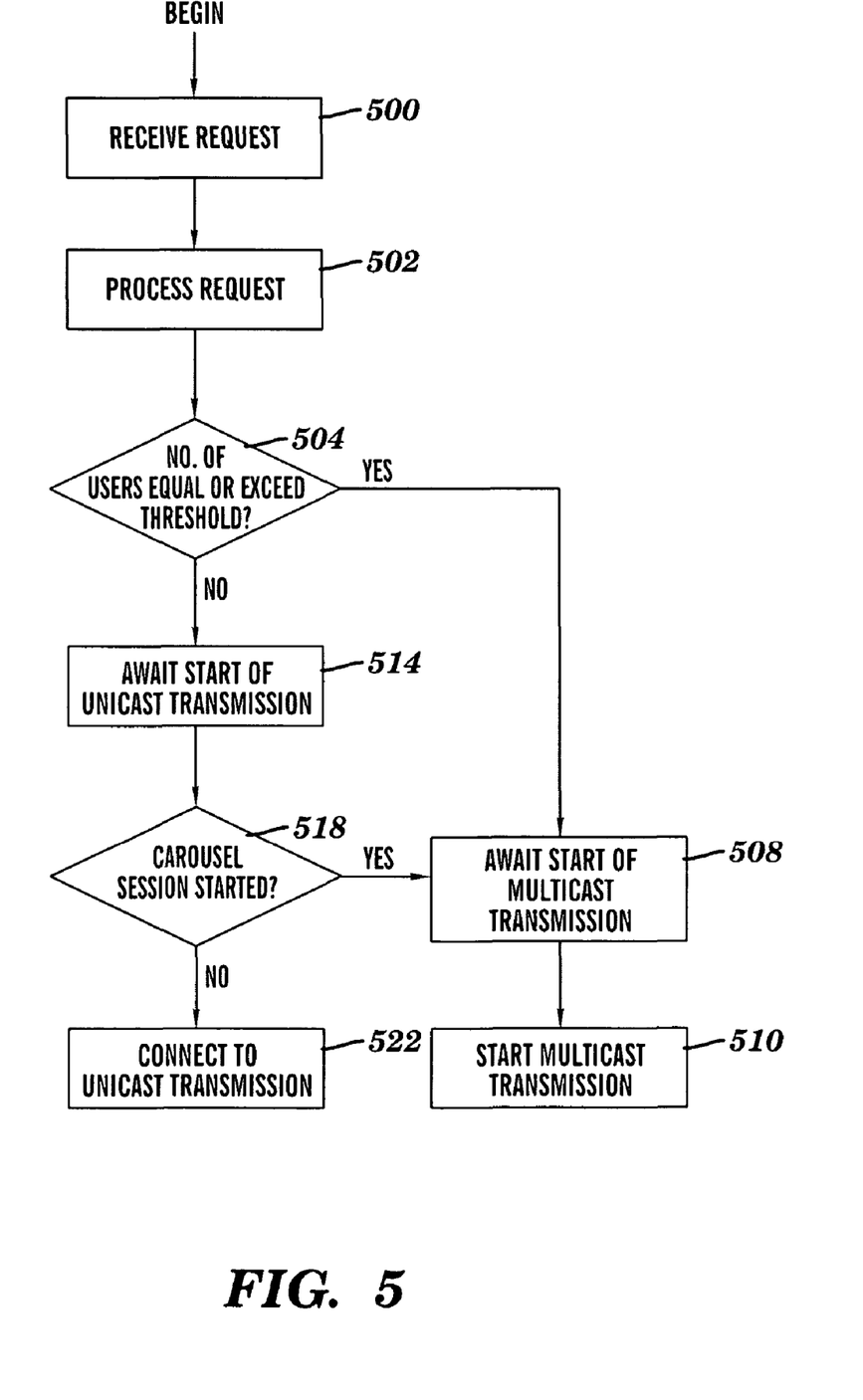
FIG. 5 is a flow chart for managing a content on demand service, in accordance with embodiments of the present invention.

FIG. 5 is a flow chart for managing a content on demand service, in accordance with embodiments of the present invention.

At step 500, a request for service is received from a user to receive a specific content.

At step 502, the request is processed to determine whether the user is entitled to receive the requested service.

Step 504 determines whether the number of users requesting the specified content is equal to or above a specified threshold within a predetermined time period.

If step 504 determines that the number of users requesting the specified content within a predetermined time period is equal to or above a specified threshold, then in step 508 the request is passed to await commencement of the multicast carousel transmission at the required start time for the user. Once the start time for the user arrives, the user is connected to the multicast stream transmission that is started in step 510.

Connecting the user to the multicast stream in step 510 may result in a first portion of the requested content being presented to the user on a main screen. In addition, the user may be connected to at least one additional multicast stream, wherein each additional multicast stream results a corresponding additional portion of the content being presented to the user on a corresponding additional screen such that each additional portion is independently sequenced before or after the first portion within the content corresponding to the fast-forward functionality and the fast-backward functionality, respectively.

If step 504 determines that the number of users requesting the specified content within a predetermined time period is not equal to or above a specified threshold, then in step 514 the request is forwarded to await the start of a unicast transmission of the content at the requested start time, followed by execution of step 518.

Step 518 determines whether a carousel session has started since step 504 was executed.

If step 518 determines that a carousel session has started since step 504 was executed, then steps 508 and 510 are executed as described supra.

If step 518 determines that a carousel session has not started since step 504 was executed, then step 522 connects the user to the unicast transmission.

Figure 6:
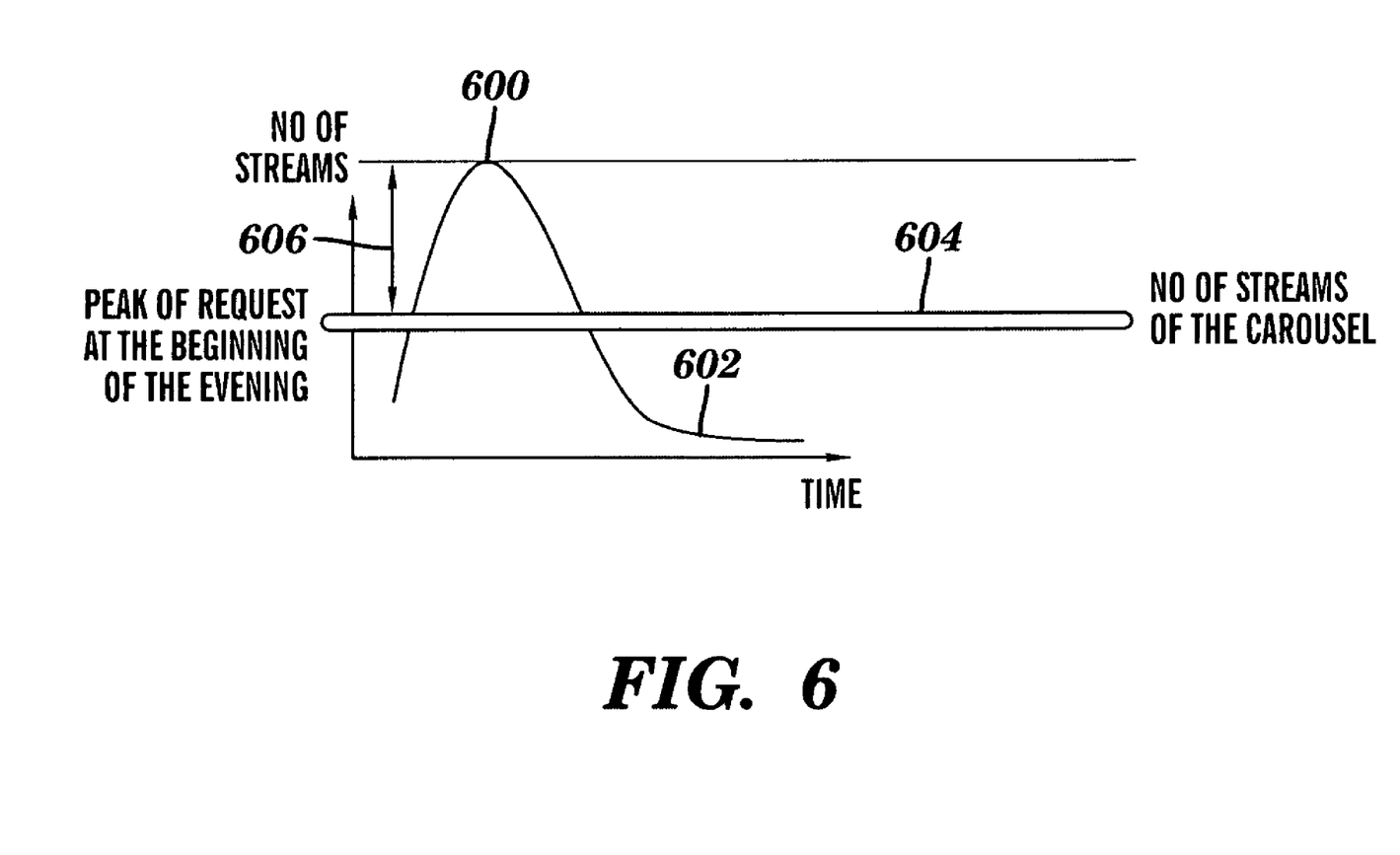
FIG. 6 is a graph illustrating how the video management process reduces the amount of bandwidth used in a VOD system during high demand periods, in accordance with embodiments of the present invention.

FIG. 6 is a graph illustrating how the video management process reduces the amount of bandwidth used in a VOD system during high demand periods, in accordance with embodiments of the present invention. In FIG. 6, a graph of numbers of video streams versus time is shown for an evening when a premier film is being shown. The numbers of streams being demanded reaches a peak 600 on the curve 602. By utilizing the carousel, the number of streams does not vary and is shown by line 604. Irrespective of how many requests are made, the overall number of streams remains the same once the video carousel is in operation. It can be clearly seen from the graph that there is a gain in bandwidth availability (606) for the service provider when using the video carousel. This gain in bandwidth may be utilized for any purpose (e.g., for providing a further film, VCR functions, etc.).

After a certain amount of time it can be seen that the number of streams being requested reduces below the level of the bandwidth required to provide the video carousel. At that point, the video carousel may be switched off and the operation relating to requests from users resorts to the unicast connection mode. This may be achieved in many different ways. In one embodiment, step 504 is utilized to notice when the numbers of request in a given time period fall below a different specified threshold, wherein subsequent requests from other users to receive the content results in connecting the other users to unicast streams of the content.

The term video on demand (VOD) may also be interpreted to include other types of content (e.g., music data or any other content). Thus content on demand services are an extension of VOD services as will be understood by those skilled in the art.

While the invention has been particularly shown and described with reference to a preferred embodiment, it will be understood that various changes in form and detail may be made therein without departing from the spirit, and scope of the invention.

What is claimed is:

1. A method for managing bandwidth in a content on demand service provided by a service provider to users, said method comprising:
receiving a request from a user to receive the content;
after said receiving, ascertaining whether a total number of users requesting the content within a predetermined time period is below a first specified threshold, wherein the time period is the time duration of the content, wherein the first specified threshold is a total number of time slots of the time period plus one, and wherein the total number of time slots of the time period consists of a plurality of time slots;
if said ascertaining ascertains that the total number of users requesting the content within the predetermined time period is below the first specified threshold, then connecting the user to a unicast stream of the content; and
if said ascertaining ascertains that the total number of users requesting the content within the predetermined time period is not below the first specified threshold, then connecting the user to a first multicast stream of the content, wherein a video carousel comprises a plurality of multicast streams that includes the first multicast stream, and wherein each multicast stream of the plurality of multicast streams has been or will be initiated at a unique time slot of the time period.

2. The method of claim 1, wherein said ascertaining ascertains that the total number of users requesting the content within the predetermined time period is not below the first specified threshold.

3. The method of claim 2, wherein there exists allocated but not started unicast transmissions, and wherein the method further comprises shifting each of said allocated but not started unicast transmissions to an equivalent multicast slot of the time period.

4. The method of claim 2, wherein the method further comprises:
determining a remaining bandwidth as a difference between a maximum available bandwidth for the service and an existing total stream bandwidth being utilized by the plurality of multicast streams; and
providing additional service to the user via the remaining bandwidth.

5. The method of claim 4, wherein the additional service comprises at least one of: a video pause functionality, a fast-forward functionality, and a fast-backward functionality.

6. The method of claim 5, wherein said connecting the user to the first multicast stream results in a first portion of the content being presented to the user on a main screen, and wherein the method further comprises connecting the user to at least one additional multicast stream of the plurality of multicast streams, and wherein each multicast stream of the at least one additional multicast stream results a corresponding additional portion of the content being presented to the user on a corresponding additional screen such that each additional portion is independently sequenced before or after the first portion within the content corresponding to the fast-forward functionality and the fast-backward functionality, respectively.

7. The method of claim 6, wherein the at least one additional multicast stream comprises a first additional multicast stream and a second additional multicast stream, wherein the first additional multicast stream presents a first additional portion of the content that is sequenced before the first portion within the content, and wherein the second additional multicast stream presents a second additional portion of the content that is sequenced after the first portion within the content.

8. The method of claim 2, wherein the method further comprises:
determining that the total number of users requesting the content within the predetermined time period is below a second specified threshold and subsequently receiving a request from other users to receive the content; and
connecting the other users to unicast streams of the content.

9. The method of claim 2, wherein the unique time slots of the time period are uniformly distributed over the time period.

10. The method of claim 2, wherein successive time slots of the unique time slots of the time period are spaced apart by one minute.

11. The method of claim 1, wherein said ascertaining ascertains that the total number of users requesting the content within the predetermined time period is below the first specified threshold.

12. A computer system comprising a server computer, said server computer comprising a processor, a memory, and a computer program stored in said memory, said computer program comprising instructions for implementing a method for managing bandwidth in a content on demand service provided by a service provider to users, said method being implemented via execution of the instructions on the server computer, said method comprising:

receiving a request from a user to receive the content; after said receiving, ascertaining whether a total number of users requesting the content within a predetermined time period is below a first specified threshold, wherein the time period is the time duration of the content, wherein the first specified threshold is a total number of time slots of the time period plus one, and wherein the total number of time slots of the time period consists of a plurality of time slots;

if said ascertaining ascertains that the total number of users requesting the content within the predetermined time period is below the first specified threshold, then connecting the user to a unicast stream of the content; and if said ascertaining ascertains that the total number of users requesting the content within the predetermined time period is not below the first specified threshold, then connecting the user to a first multicast stream of the content, wherein a video carousel comprises a plurality of multicast streams that includes the first multicast stream, and wherein each multicast stream of the plurality of multicast streams has been or will be initiated at a unique time slot of the time period that.

13. The computer system of claim 12, wherein said ascertaining ascertains that the total number of users requesting the content within the predetermined time period is not below the first specified threshold.

14. The computer system of claim 13, wherein there exists allocated but not started unicast transmissions, and wherein the method further comprises shifting each of said allocated but not started unicast transmissions to an equivalent multicast slot of the time period.

15. The computer system of claim 13, wherein the method further comprises:

determining a remaining bandwidth as a difference between a maximum available bandwidth for the service and an existing total stream bandwidth being utilized by the plurality of multicast streams; and providing additional service to the user via the remaining bandwidth.

16. The computer system of claim 15, wherein the additional service comprises at least one of: a video pause functionality, a fast-forward functionality, and a fast-backward functionality.

17. The computer system of claim 16, wherein said connecting the user to the first multicast stream results in a first portion of the content being presented to the user on a main screen, and wherein the method further comprises connecting the user to at least one additional multicast stream of the plurality of multicast streams, and wherein each multicast stream of the at least one additional multicast stream results a corresponding additional portion of the content being presented to the user on a corresponding additional screen such that each additional portion is independently sequenced before or after the first portion within the content corresponding to the fast-forward functionality and the fast-backward functionality, respectively.

18. The computer system of claim 17, wherein the at least one additional multicast stream comprises a first additional multicast stream and a second additional multicast stream, wherein the first additional multicast stream presents a first additional portion of the content that is sequenced before the first portion within the content, and wherein the second additional multicast stream presents a second additional portion of the content that is sequenced after the first portion within the content.

19. The computer system of claim 13, wherein the method further comprises:

determining that the total number of users requesting the content within the predetermined time period is below a second specified threshold and subsequently receiving a request from other users to receive the content; and connecting the other users to unicast streams of the content.

20. The computer system of claim 12, wherein said ascertaining ascertains that the total number of users requesting the content within the predetermined time period is below the first specified threshold.

* * * * *